UNITED STATES PATENT OFFICE 2,630,438

DRYING OIL COMPOSITION

Robert H. Rosenwald, Western Springs, Ill., assignor to Universal Oil Products Company, Chicago, Ill., a corporation of Delaware No Drawing. Application December 16, 1950,
Serial No. 201,230

9 Claims. (Cl. 260—398.5)

This invention relates to drying oil compositions containing an additive designed to retard the tendency of such oils to form an undesirable skin on the surface thereof when stored. More specifically, the present invention concerns a composition of matter containing a drying oil which normally, and in the absence of the present novel additive component, tends to develop a skin on the surface of the liquid drying oil and in addition to said drying oil an anti-skinning agent selected from certain oxadiazoles as hereinafter more specifically described.

A commonly recognized problem in the use of drying oils and compositions containing the same, such as paint and varnishes, is the tendency of such products to form an undesirable skin at the surface of said drying oil compositions when the latter are stored en masse for long periods of time, especially when the space above the drying oil composition is occupied by an oxygen-containing gas in contact with the surface of the oil. The formation of such a drying oil skin which is a relatively tough, insoluble film of varying thickness depending upon the period of storage and the oxygen content of the gas above the surface of the oil, interferes with the ready use of the product, since if not removed from the drying oil composition the skin tends to break apart in small particles to form a suspension of solid particles in the composition which particles ultimately appear in the final protective coating and produce a rough, irregular surface. The formation of the undesirable skin is believed to result at least in part from oxidative reactions occurring during the storage of the drying oil composition and has been observed to form even in closed containers in which the space occupied by the oxygen-containing gas above the surface of the oil or composition is small relative to the total volume or mass of drying oil in the container. Irrespective of the cause of such skin formation, the drying oil compositions provided herein and containing the oxidation inhibitor additive exhibit a reduced tendency towards such skin formation and the principal object of this invention is to provide such a drying oil composition in which skin formation is retarded. Another object of the invention is to add a suitable organic compound in relatively small quantities to a drying oil composition to thereby retard the tendency of the composition to undergo the chemical changes accompanying the formation of undesirable skin on the surface of such composition.

In one of its embodiments, the present invention concerns a drying oil composition comprising a drying oil and a compound having the following structural formula:

wherein Ar is a polyvalent aromatic hydrocarbon radical, $R_1$ and $R_2$ are selected from the group consisting of hydrogen, alkyl, aryl, aralkyl, nitro, halogen, alkoxy, and hydroxy, and $n$ is a number selected from one and two.

A specific embodiment of the present invention relates to a drying oil composition comprising an unsaturated fatty acid glyceride drying oil and from 0.01 to about 1% by weight of benzofuroxan.

The present invention may be effectively applied in the formulation of a large number of coating compositions containing drying oils which tend to undergo undesirable skin formation, irrespective of the type of drying oil, provided any one or more of the individual components of the drying oil composition does not undergo incidental or side reactions with the present anti-skinning agent. In general, the drying oils which tend to undergo skin formation when stored en masse for prolonged periods of time are generally the unsaturated fatty acid glyceride drying oils or their esters with alcohols other than glycerol. The tendency, and in most cases the rate of skin formation is usually directly proportional to the number of unsaturated or olefinic double bonds particularly conjugated double bonds, contained in the structure of the drying oil and is thus more rapid for such drying oils as tung oil, bodied linseed oil, dehydrated castor oil, oiticica oil, and others containing two or more unsaturated bonds per fatty acid portion of the tri-glyceride molecule and in general is less rapid for such oils as soybean oil, walnut oil, and others of more highly saturated structure. Another class of drying oils subject to skin formation when stored en masse and which may be composited with the present anti-skinning agents to the drying oil composition of this invention in which the tendency to form a skin on the surface thereof is retarded, are the unsaturated hydrocarbon type drying oils, one of the specific examples of which is the unsaturated conjunct polymer hydrocarbons comprising a mixture of polyolefinic, cyclic hydrocarbons recovered from the sludges formed in the treatment of hydrocarbon charging stocks with acid-acting conjunct polymerization catalysts. The above-enumerated types and specific examples of typical drying oils utilizable in the present composition are merely illustrative of the large number of such oils obtained from naturally occurring as well as synthetic sources and the present invention is intended to relate to drying oil compositions containing the oils not only in their "as recovered" condition but also such oils after suitable treatment to enhance their drying or other properties, such as oil subjected to bodying, decolorization, and other treatments designed to improve their physical and drying properties. The drying oils utilizable in protective coating compositions and the other ingredients of such compositions, including paints, varnishes, lacquers, and other protective coating compositions, as well as the recovery and method of treatment of natural and synthetic oils is well known in the art and requires no present detailed description explaining the preparation and use of the present drying oil compositions.

The anti-skinning agents utilizable in the present composition to retard the formation of undesirable skin on the surface of drying oil compositions are broadly characterized as oxadiazoles of poly-cyclic structure in which one of the cyclic portions of the molecule is a polyvalent aromatic hydrocarbon nucleus and the other ring attached to the polyvalent aromatic group at nuclear positions ortho to each other is a heterocyclic nitrogen-oxygen ring, the preferred compounds having the structure of either benzofuroxanes or benzofurazanes. The empirical structure of these compounds may be represented by the following structural formula:

in which Ar is a polyvalent aromatic hydrocarbon radical, $n$ has a value selected from one and two, and $R_1$ and $R_2$ are nuclear aromatic substituents selected from the group consisting of hydrogen, alkyl, aryl, aralkyl, nitro, halogen, alkoxy, and hydroxy. The class of compounds represented by the above formula in which $n$ has a value of one and Ar is benzo are known in the chemical arts as benzofurazanes while the corresponding benzo derivatives represented by the above formula in which $n$ has the value of two are known generally as benzofuroxanes, $R_1$ and $R_2$ in such cases being hydrogen.

The aromatic furoxanes and aromatic furazanes utilizable as anti-skinning agents in the present drying oil compositions may be selected from either the monocyclic or benzo aromatic series or from bicyclic or naphthoaromatic series. Some of the typical representative compounds of the present series, include for example, benzofuroxan, benzofurazan, naphthofuroxan, naphthofurazan, and derivatives of the above in which modifying radicals are substituted on the aromatic portion of the molecules, such as the alkyl aromatic derivatives in which the alkyl radicals are substituted on the 4, 5, 6 or 7 positions of the aromatic portion of the molecule, including the dialkyl substituted compounds such as 5,6-dimethylbenzofuroxan and 5,6-dimethylbenzofurazan, 5-ethyl-6-tert.-butylbenzofurazan, certain alkoxy derivatives such as 5-methyl-6-methoxybenzofurazan, 4 - methyl - 6 - tert. - butylbenzofurazan, and other derivatives in which the alkyl and alkoxy radicals vary in chain length and the position they occupy on the aromatic ring. Other typical derivatives which act as anti-skinning agents include such compounds as 5 - chlorobenzofurazan, 6,7 - dinitronaphthofurazan, 4,7 - dihydroxynaphthofuroxan, and other derivatives in which the substituent radicals occupy diverse nuclear positions on the aromatic ring. The preferred compounds of the above series are unsubstituted benzofuroxan and benzofurazan as well as the derivatives containing at least one alkyl substituent, said alkyl groups containing not more than about five carbon atoms per alkyl substituent.

The aromatic furazan and furoxan derivatives are effective as additives in drying oil compositions generally in amounts less than about 1% by weight of the composition and in most cases are effective in amounts of from about 0.01% to about 0.1% by weight of the composition. The present drying oil compositions may also contain other components such as pigments, various metal oxides, such as titanium dioxide, lead oxide, etc., and many other ingredients common to drying oil compositions qualified, however, in that such other ingredients do not cause side reactions with the essential components of the drying oil composition to reduce the effectiveness of the anti-skinning additive component. The ingredients of the present drying oil composition, may be composited, for example, by initially dissolving the aromatic furoxan or aromatic furazan in a small quantity of the drying oil and adding the resulting solution to the main body of the drying oil composition containing the other components in solution or suspension therein, or by dissolving the additive in another suitable solvent, such as a low molecular weight alcohol, a ketone such as acetone, or an ester such as ethylacetate and thereafter adding the resulting solution to the main portion of the drying oil composition and thoroughly mixing the same to uniformly distribute the additive throughout the drying oil composition.

It is often preferable when compositing the present drying oil ingredients to omit the inclusion of metallic driers from the composition until just prior to the use of the drying oil composition as a protective coating, since these compounds in general tend to reduce the anti-skinning effect of the additive component and therefore generally act antagonistically to the additives.

The present invention is further illustrated with respect to specific embodiments thereof, such as specific drying oil compositions containing one of the alternative additive components provided in the present invention, in the following examples which, however, are not intended to limit the generally broad scope of the invention in strict accordance therewith.

A series of drying oil compositions was prepared by mixing an unsaturated fatty acid glyceride with a benzofuroxan or a benzofurazan and comparing the resulting mixture with drying oil compositions containing a cobalt naphthenate drier and with compositions containing no drier. The effectiveness of the present additives was measured by determining the time required for the formation of a skin on the surface of drying oil compositions in one series of which the additive was present and in another series of which the additive was omitted. The samples were stored in closed containers having a small layer of air above the surface of the drying oil composition in the container. The compositions containing the additive were prepared by mixing the drying oil with the additive in an amount of about 0.1% by weight of the composition until the benzofurazan or the benzofuroxan dissolved in the oil at temperatures of from 30 to about 50° C. When utilized in the composition, the drier consisting of cobalt naphthenate was mixed with a small amount of the drying oil and heated to about 100° C. until the drier dissolved in the drying oil and thereafter combining a sufficient quantity of the resulting solution with a drying oil to provide a composition containing about 0.12% by weight of the cobalt naphthenate. The resulting compositions were stored in closed containers having an air space above the surface of the drying oil composition roughly equivalent to about 1/5 the volume of drying oil present in the container. The containers were thereafter stored for the indicated period of time and opened periodically to make the qualitative determination of the extent of skin formation on the surface of the oil. The following table indicates the results of this test.

TABLE

*Skin formation on the surface of stored drying oil compositions—the effect of anti-skinning agents*

| Drying Oil | Anti-Skinning Agent | Presence of Drier | Days to Form Skin [1] | | | | |
|---|---|---|---|---|---|---|---|
| | | | 1 | 12 | 22 | 38 | 64 |
| Tung oil | none | none | — | — | — | slight | * |
| Do | benzofuroxan | present | slight | * | ** | *** | *** |
| Do | benzofurazan | none | — | — | — | — | — |
| Do | benzofuroxan | do | — | — | — | — | — |
| Do | benzofurazan | present | — | — | slight | slight | * |
| Do | none | do | — | — | — | do | * |
| Bodied linseed oil | do | none | — | — | slight | * | ** |
| Do | benzofuroxan | do | — | — | — | — | — |
| Do | benzofurazan | do | — | — | — | — | — |

[1] NOTE.—The extent of skin formation is indicated by the designations indicated above: (−) indicating no skin formation whatsoever; (slight) indicating skin formation near the walls of the container only; (*) indicating a thin layer of skin over the entire surface, but only from about 0.1 to about 0.5 mm. in thickness; () indicating moderately thick skin formation of about 0.5 to 1 mm. in thickness; and (*) indicating relatively heavy skin formation of greater thickness than 1.0 mm.

I claim as my invention:

1. A drying oil composition containing an organic compound having the following empirical formula:

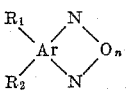

wherein Ar is a polyvalent aromatic hydrocarbon radical, $n$ is a small whole number selected from one and two, and $R_1$ and $R_2$ are selected from the group consisting of hydrogen, alkyl, aryl, aralkyl, nitro, halogen, alkoxy, and hydroxy.

2. The composition of claim 1 further characterized in that at least one of the substituents $R_1$ and $R_2$ is selected from an alkyl radical containing not more than about five carbon atoms per radical.

3. The composition of claim 1 further characterized in that said Ar is a benzo radical.

4. The composition of claim 1 further characterized in that said organic compound is present in the drying oil composition in an amount of from about 0.01 to about 1% by weight thereof.

5. The composition of claim 1 further characterized in that said organic compound is benzofuroxan.

6. The composition of claim 1 further characterized in that said organic compound is benzofurazan.

7. A drying oil composition containing an unsaturated fatty acid ester and an organic compound having the following empirical formula:

wherein Ar is a polyvalent aromatic hydrocarbon radical, $n$ is a small whole number selected from one and two, and $R_1$ and $R_2$ are selected from the group consisting of hydrogen, alkyl, aryl, aralkyl, nitro, halogen, alkoxy, and hydroxy.

8. The drying oil composition of claim 7 further characterized in that said unsaturated fatty acid ester is tung oil.

9. The drying oil composition of claim 7 further characterized in that said unsaturated fatty acid ester is linseed oil.

ROBERT H. ROSENWALD.

REFERENCES CITED

The following references are of record in the file of this patent:

UNITED STATES PATENTS

| Number | Name | Date |
|---|---|---|
| 2,555,509 | Rosenwald | June 5, 1951 |

OTHER REFERENCES

Patterson et al.: The Ring Index, Reinhold Publishing Co., N. Y. C., 1940, p. 180.